(12) United States Patent
Che et al.

(10) Patent No.: US 9,710,289 B2
(45) Date of Patent: Jul. 18, 2017

(54) RAPID CONFIGURATION OF SOFTWARE

(71) Applicant: International Business Machines Corporation, Armonk, NY (US)

(72) Inventors: Yang Che, Beijing (CN); Xue Xiang Cui, Beijing (CN); Xia Zhang, Beijing (CN); Ke Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 14/068,120

(22) Filed: Oct. 31, 2013

(65) Prior Publication Data

US 2014/0137099 A1    May 15, 2014

(30) Foreign Application Priority Data

Oct. 31, 2012   (CN) .......................... 2012 1 0428865

(51) Int. Cl.
*G06F 9/445* (2006.01)
(52) U.S. Cl.
CPC ............................... *G06F 9/44505* (2013.01)
(58) Field of Classification Search
None
See application file for complete search history.

(56) References Cited

U.S. PATENT DOCUMENTS 6,453,346 B1 * 9/2002 Garg et al. ..................... 709/224
6,735,691 B1 * 5/2004 Capps et al. ..................... 713/1

(Continued)

FOREIGN PATENT DOCUMENTS

CN    102006301 A    4/2011
CN    102207859 A    10/2011

OTHER PUBLICATIONS

Azagury et al., "Khnunn—A Scalable Rapid Application Deployment System for Dynamic Hosting Infrastructures," IFIP/IEEE Eighth International Symposium on Integrated Network Management, Mar. 2003, pp. 307-320.

(Continued)

*Primary Examiner* — Jue Louie
(74) *Attorney, Agent, or Firm* — Yee & Associates, P.C.; Stephen Yoder

(57) ABSTRACT

In a field of software configuration, a technology of migrating and configuring software rapidly by determining a correspondence between device specific information and a specific configuration file location recording such information. According to one aspect of the present invention, a method for software fast configuration is provided comprising: obtaining and analyzing a software configuration program to identify a method related to the device specific information in the software configuration program; adding an identification to the device specific information obtained by the method related to the specific device information; and determining a correspondence between the device specific information and its record location in a software configuration file based on the added identification. According to the technical solution of the present invention, the correspondence between the record location in the configuration file and the device specific information may be automatically recorded and/or may be used for rapid configuration of software.

14 Claims, 6 Drawing Sheets

(56) References Cited

U.S. PATENT DOCUMENTS

| | | | |
|---|---|---|---|
| 6,854,112 B2 | 2/2005 | Crespo et al. | |
| 7,552,125 B1* | 6/2009 | Evans | G06F 17/30 |
| | | | 707/999.001 |
| 2003/0130980 A1* | 7/2003 | Bell et al. | 707/1 |
| 2004/0098707 A1* | 5/2004 | Tang et al. | 717/130 |
| 2004/0194079 A1* | 9/2004 | Nguyen et al. | 717/168 |
| 2004/0250247 A1 | 12/2004 | Deeths et al. | |
| 2005/0278432 A1* | 12/2005 | Feinleib et al. | 709/213 |
| 2005/0286514 A1* | 12/2005 | Cheshire | H04L 29/06 |
| | | | 370/389 |
| 2005/0289536 A1 | 12/2005 | Nayak et al. | |
| 2007/0220248 A1* | 9/2007 | Bittlingmayer et al. | 713/100 |
| 2009/0144714 A1 | 6/2009 | Fan et al. | |
| 2009/0222466 A1 | 9/2009 | Allison et al. | |
| 2010/0223306 A1 | 9/2010 | Liu et al. | |
| 2010/0325624 A1 | 12/2010 | Bartolo et al. | |
| 2011/0107327 A1* | 5/2011 | Barkie et al. | 717/176 |
| 2011/0265077 A1 | 10/2011 | Collison et al. | |
| 2011/0265087 A1 | 10/2011 | Chen et al. | |
| 2011/0265164 A1 | 10/2011 | Lucovsky et al. | |
| 2012/0005465 A1 | 1/2012 | Attanasio et al. | |
| 2012/0174095 A1 | 7/2012 | Natchadalingam et al. | |
| 2013/0262638 A1* | 10/2013 | Kumarasamy et al. | 709/221 |

OTHER PUBLICATIONS

Nadgir, "Method and apparatus for automated configuration and deployment of multi-tenant software applications," IP.com Prior Art Database Technical Disclosure No. IPCOM00018182D, Apr. 14, 2009, 5 pages.

Office Action, dated Jul. 1, 2016, regarding Chinese Patent Application No. CN201210428865.9, 7 pages.

* cited by examiner

```
public class InetAddress implements java.io.Serializable {
...
public String getHostName() {
    if (hostName == null) {
        hostName = InetAddress.getHostFromNameService(this, check);
    }
    return hostName;
    }
...
}
```

FIG. 4A

```
public class InetAddress implements java.io.Serializable {
...
private String getHostNameImpl() {
    if (hostName == null) {
        hostName = InetAddress.getHostFromNameService(this, check);
    }
    return hostName;
    } public String getHostName() {
    if (hostName == null) {        ①
        hostName = getHostNameImpl();
                                    ②
    hostName=ConfigurationAnalyzer.getTrackID(this.hostName,"hostname");
    }
    return hostName;
    }
```

FIG. 4B

```
public class FileOutputStream extends OutputStream
{
...
private File file;
public void write(byte b[]) throws IOException {
    writeBytes(b, 0, b.length, file);
    }
...
}
```

FIG. 4C

```
public
class FileOutputStream extends OutputStream
{
...
private File file;

private int currentRow=-1;

private void writeImpl(byte b[]) throws IOException {
    writeBytes(b, 0, b.length, file);
    } public void write(byte b[]) throws IOException {
    if(currentRow<0) {
            currentRow = caculateRowsFromFile(file);    ①
        }
    b = ConfigurationTracker.analyze(b, file, currentRow);    ②
    currentRow= caculateRowsFromBytes(currentRow,b);
    writeImpl(b);    ③
}
```

FIG. 4D

RAPID CONFIGURATION OF SOFTWARE

CROSS REFERENCE TO RELATED APPLICATION

This Application claims the benefit of priority to China Patent Application Serial No. 201210428865.9, filed on Oct. 31, 2012, the contents of which are hereby incorporated by reference.

BACKGROUND

The present invention relates to the field of software configuration. More specifically, to a technology of migrating and configuring software rapidly through determining a correspondence between device-specific information and a specific configuration file location recording the information.

At present, with the expedite development of virtualization and cloud computing technology, rapid configuration of software becomes more and more significant. Software configuration becomes particularly significant in the scenario of software migration. The software migration refers to migrating software from one machine to another machine; generally, the "machine" here refers to a virtual machine. For example, in a cloud platform, the software is migrated from one virtual machine to another virtual machine. During the running process, the software needs to rely on the software configuration file as generated upon installation. The software configuration file records much significant parameter information which is also called "device specific information". The specific device parameter information on which the same software relies when running on different virtual machines or physical machines, which also cause a major problem in software migration process: how to improve the software migration speed and efficiency as far as possible while guaranteeing the correctness of software migration configuration file.

The prior art has proposed a plurality of technical solutions of resolving software configuration during a software migration process. First, specific scripts are written for the software and the migration of the software is performed between different virtual machines using the written scripts. The drawbacks of this solution lie in that compilation of the script program needs a more in-depth understanding on the software, which has to consume a considerable amount of manpower. Moreover, each script is merely suitable for a particular piece of software and thus is not universal.

Second, when it is required to newly start a virtual machine, the software has to be re-installed and configured. A significant drawback of this solution is much time-consuming. For lots of large business software, it would consume couples of hours to re-install and configure.

Third, the software deployment environment is limited, i.e., migration is limited merely in a running environment having the same device specific information. This limitation actually goes against the technical development trend of the open platform of cloud computing, which does not realize a true software migration.

To sum up, a main problem in the prior art is that the record location of the device specific information in software configuration cannot be obtained, and therefore it is impossible to reuse the existing software configuration file during the software migration process, which causes low efficiency of software configuration.

SUMMARY

In view of the above problems, one of the objectives of the present invention lies in providing a technical solution for rapid configuration of software or providing a technical solution of rapidly and correctly perform software configuration during software migration. Another objective of the present invention is providing a technical solution for automatically recording the correspondence between a record location in a configuration file and device specific information. The above inventive objectives may stand independently, and it is unnecessary to satisfy all mentioned inventive objectives simultaneously.

According to one aspect of the present invention, a method for rapid configuration of software is provided. The method comprises obtaining and analyzing a software configuration program to identify a method related to the device specific information in the software configuration program; adding an identification to a string value of the device specific information obtained by the method related to the specific device information; and determining a correspondence between the device specific information and its record location in a software configuration file based on the added identification.

According to a further aspect of the present invention, a system for rapid configuration of software is provided. The system comprises an identifying module configured to obtain and analyze a software configuration program to identify a method related to the device specific information in the software configuration program; an identification adding module configured to add an identification to a string value of the device specific information obtained by the method related to the specific device information; and a correspondence determining module configured to determine a correspondence between the device specific information and its record location in a software configuration file.

According to the method or system provided by the present invention, the correspondence between the record location in the configuration file and the device specific information may be automatically recorded and/or may be used for rapid configuration of software.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4A shows examples of code before the operation of injecting code according to an embodiment of the present invention;

FIG. 4B shows examples of code after the operation of injecting the code depicted in FIG. 4A according to an embodiment of the present invention;

FIG. 4C shows examples of code before the operation of injecting code according to another embodiment of the present invention;

FIG. 4D shows examples of code after the operation of injecting the code depicted in Figure C according to the another embodiment of the present invention;

DETAILED DESCRIPTION

Figure 1:
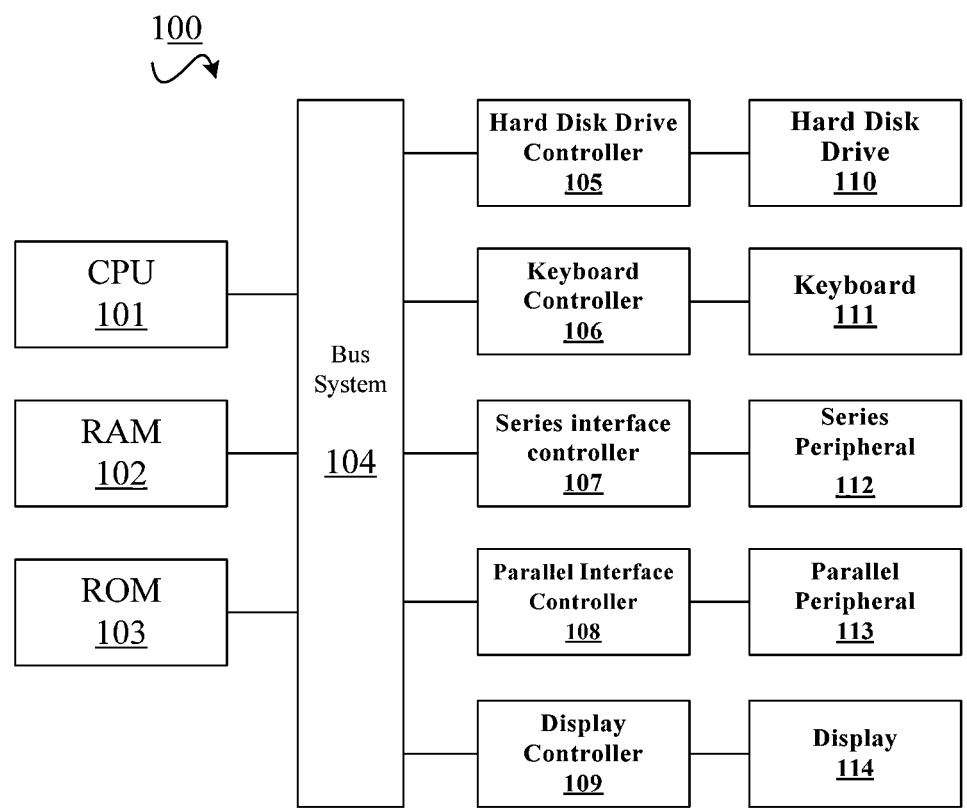
FIG. 1 shows an exemplary computer system 100 which is applicable to implement the embodiments of the present invention.

Hereinafter, a method and system for rapid configuration of software according to the present invention will be described in detail through preferred embodiments with reference to the drawings.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Now, refer to FIG. 1. FIG. 1 shows an exemplary computer system 100 which is applicable to implement the embodiments of the present invention. As illustrated in FIG. 1, the computer system 100 may comprise: a CPU (Central Processing Unit) 101, a RAM (Random Access Memory) 102, a ROM (Read Only Memory) 103, a system bus 104, a hard disk controller 105, a keyboard controller 106, a serial interface controller 107, a parallel interface controller 108, a monitor controller 109, a hard disk 110, a keyboard 111, a serial peripheral device 112, a parallel peripheral device 113 and a monitor 114. Among these components, connected to the system bus 104 are the CPU 101, the RAM 102, the ROM 103, the hard disk controller 105, the keyboard controller 106, the serial interface controller 107, the parallel interface controller 108 and the monitor controller 109. The hard disk 110 is coupled to the hard disk controller 105; the keyboard 111 is coupled to the keyboard controller 106; the serial peripheral device 112 is coupled to the serial interface controller 107; the parallel peripheral device 113 is coupled to the parallel interface controller 108; and the monitor 114 is coupled to the monitor controller 109. It should be understood that the structural block diagram in FIG. 1 is shown only for illustration purpose, and is not intended to limit the scope of the present invention. In some cases, some devices may be added or reduced as required.

Figure 2:
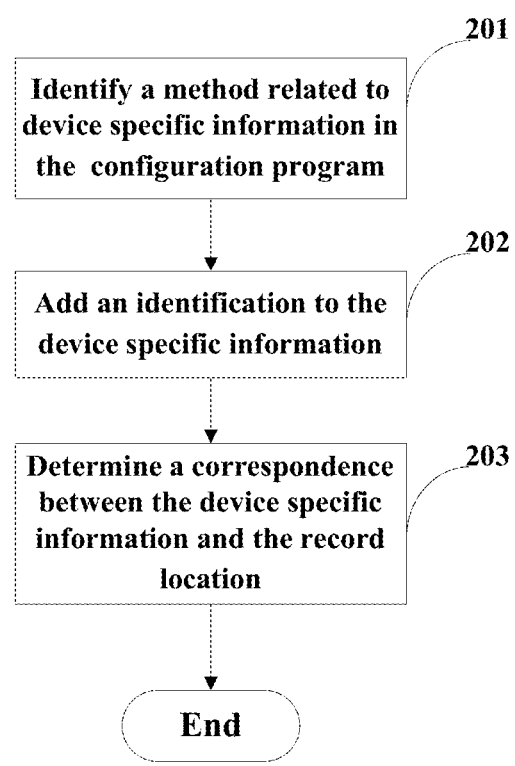
FIG. 2 shows a flowchart of a method for rapid configuration of software according to one embodiment of the present invention.

Next, FIG. 2 will be introduced. FIG. 2 shows a flow chart of a method for rapid configuration of software according to one embodiment of the present invention. The method as shown in FIG. 2 starts from step 201. At step 201, a software configuration program is obtained and analyzed to identify a method related to device specific information in the software configuration process. The "method" here may be considered as a certain function in a program. The "software program function" is different from the software program itself and refers to a program which is needed to execute during the installation process, for example, an installer program, etc. According to one embodiment of the present invention, the device specific information comprises at least one of the following: a host name, an IP address, a MAC address, and a file path. Correspondingly, the method related to the device specific information may be getHostName( ) ("host name"), getHostAddress( ) ("IP address"), getWindowsMACAddress( ) ("MAC address"), and getAbsolutePath( ) ("file path"). Such methods related to the device specific information may obtain corresponding string value, for example, the value of the HostName is "apple." During the running of the configuration program, these obtained string values will be written into the configuration file of the software. Those skilled in the art should understand that the device specific information may further comprise a plurality of other kinds, and accordingly, the methods related to the device specific information in the software configuration program might also be plural. It should be further noted that the program code may be analyzed using the existing technical means to identify a particular type of method, which will not be detailed here.

Next, the method of FIG. 2 proceeds to step 202 to add an identification to specific device information obtained by the method related the device specific information. The objective of adding an identification is to track string values of the device specific information as read/obtained by these methods related to the device specific information, in order to locate the file location for writing in the subsequent process of writing these strings into the configuration file. Therefore, the added identification may also be understood as an "ID for tracking device specific information string value". According to one embodiment of the present invention, adding an identification to the identified method related to the device specific information comprises: replacing the identified method related to the device specific information with a new method with the identification, the identification being used to distinguish different device specific information. Those skilled in the art should understand that the code injection technology is an existing technology, which may modify the target code of the program by injecting the code of byte-code without obtaining the source code of the program. The program languages that may employ the code injection on the level of target code comprise, for example, Java, Ruby, PHY, C#, etc. The implementation details of code injection will not be detailed here. According to these embodiments, although the object of adding an identification is a specific value of the device specific information, it may perform the code injection operation in the method of the configuration program before the configuration program reads the specific value for the device specific information, such that once the value of the device specific information is read by executing the configuration program, an identification may be automatically added thereto. FIGS. 4A and 4B illustrate a method related to the device specific information before code injection and a new method after the code injection. It can be seen from FIG. 4A that the original method related to the device specific information in the software configuration program is getHostName( ) After the code injection, as shown in FIG. 4B, the original getHostName( ) is renamed and set as a private method; in this example, the getHostName( ) is modified as getHostNamelmpl( ); while the new gctHostnamc( ) getHostName( ) method first calls the getHostNameImpl to obtain a real hostname, and an identification (tracking ID) is assigned to the method related to the device specific information, i.e., generating a specific identification by ConfigurationAnalyzer.getTrackID. In the meantime, a tracking list is created to track the device specific information. The tracking list takes the IDs for tracking the string value of the device specific information as the keywords, and takes the original values as the values. Those skilled in the art should understand that an identification may be constructed in a plurality of manners. For example, the added identification may be defined as "data type+DSC+original value"; then, suppose the HostName value obtained by the original method is "apple," then adding the identification to the value "apple" read by the original method results in "Hostname-DSC-apple." This is only a specific manner of generating an identification, and those skilled in the art may of course employ a plurality of other manners to define the generation rule for the identification. Suppose the string value of the HostName obtained by the software configuration program without code injection as in FIG. 4A in execution is "Apple," then the string value of the HostName obtained by the software configuration program after injection as shown in FIG. 4B in execution is automatically changed into "Hostname-DSC-apple."

Next, at step 203, a correspondence between the device specific information and its record location in a software configuration file is determined based on the added identification. First, it should be noted that the execution of the software configuration program may be generally divided into two phases. In the first phase, the configuration program executes the method related to the device specific information in order to obtain the value (string value) of the device specific information adapted to a specific running environment. Then in the second phase, these obtained string values of the device specific information will be written into the configuration file of the software. The step 203 may be understood as being executed during the second phase of writing into the configuration file. Since an identification has been added to the read string value of the device specific information at step 202, it is possible at step 203 to track and record the path as well as the row and column of the configuration file where the specific string is written with the added identification, such that the correspondence between the device specific information and its record location in the software configuration file may be determined.

As above mentioned, once the correspondence between the device specific information and its record location in the software configuration file is established, in the subsequent process of software re-configuration or in the subsequent configuration process after software migration, it is only necessary to use such correspondence to acquire the string value of the device specific information under the new environment such that the software configuration can be accomplished by directly replacing the new string value into the old string at the corresponding location in the corresponding configuration file. It is unnecessary to re-perform the time-consuming software re-installation and manual configuration work, or to write a particular configuration script for each piece of software. Moreover, it has a strong versatility.

Figure 3:
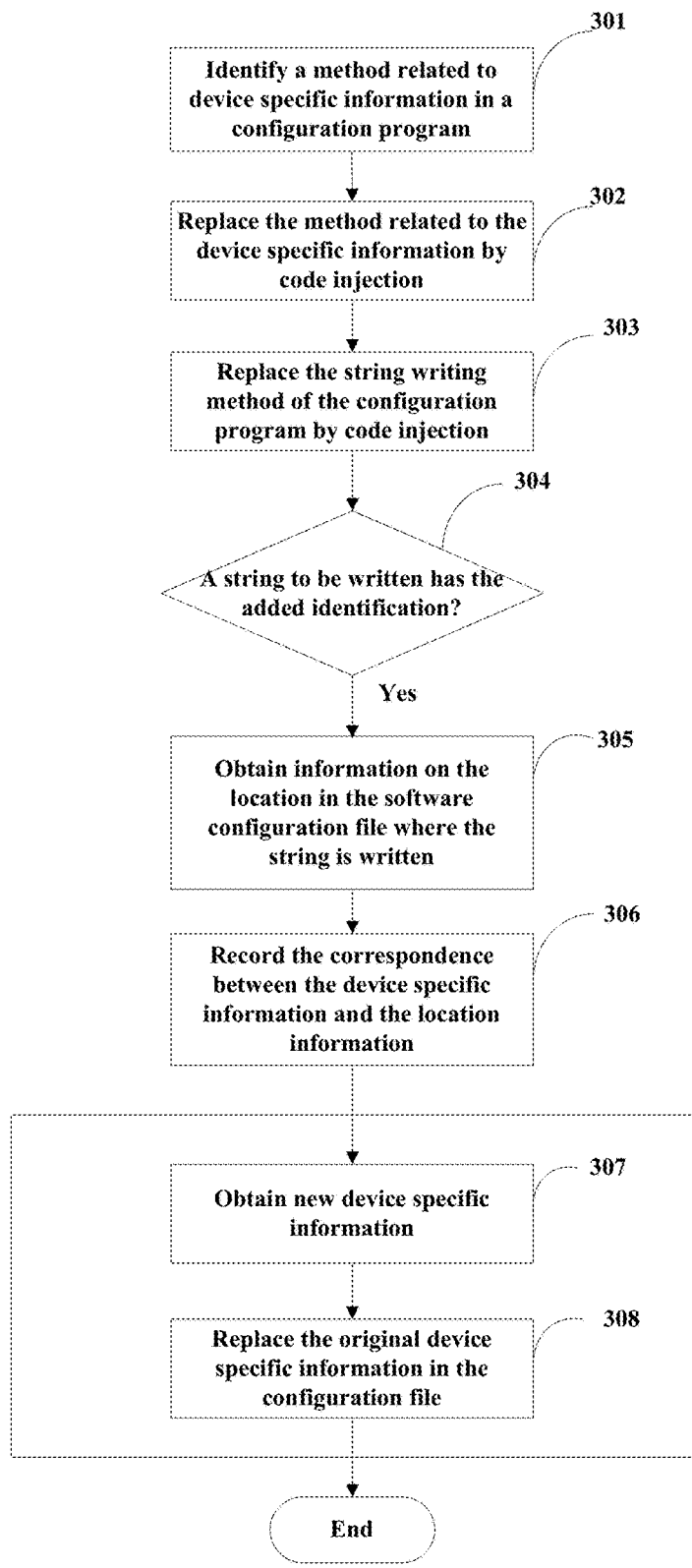
FIG. 3 shows a flowchart of a method for rapid configuration of software according to another embodiment of the present invention.

FIG. 3 shows a flowchart of a method for rapid configuration of software according to another embodiment of the present invention. At step 301, a software configuration program is obtained and analyzed to identify a method related to the device specific information in the software configuration program. At step 302, the identified method related to the device specific information is replaced, by code injection, with the new method having an identification, the identification being used to distinguish different device specific information. The step 301 may be understood as corresponding to step 201 in FIG. 2, and step 302 has been described in detail in FIG. 2 as a specific embodiment, which will not be detailed here.

At step 303, the string writing method in the software configuration program is replaced, by code injection, with a method for detecting whether the string to be written into the software configuration has the added identification. The software configuration program generates a configuration file by executing a writing operation, but not all the written strings are device specific information. For those strings which are not device specific information, it is unnecessary to make any modifications during the software migration or reconfiguration process. FIGS. 4C and 4D show a writing method before and after code injection according to one embodiment of the present invention. The writing method write ( ) in FIG. 4C is renamed and set as a private method. In this example, write( ) is modified as writeImpl( ), and the new write( ) method is for detecting whether a string to be written into the software configuration file has the added identification. From the injected code of the new method as shown in FIG. 4D, it is also be seen that the end of the code segment is restored to the original string value, i.e., the string value of the device specific information finally written into the configuration file is still "apple" instead of "Hostname-DSC-apple" with the identification being added. This ensures the correctness of the current configuration file information.

Next, at step 304, it is decided whether the string to be written into the software configuration file has the added identification. Because the previously added identification has been recorded and its correspondence with the original string has been recorded in the tracking list, when the software configuration program is to execute the writing method, if it is decided that the string to be written into the software configuration file has the previously added identification, then the process proceeds to step 305 to obtain the information on the specific location in the software configuration file where the string is to be written. If it is decided that the string that to be written into the software configuration file has no the previously added identification, it means that this string is not the device specific information and therefore it is unnecessary to track its writing location in the configuration file. As a result, no information on the specific location in the software configuration file where the string is written is obtained.

At step 305, according to one embodiment of the present invention, in response to a positive result of the decision, obtaining the information on the specific location in the software configuration file where the string is written comprises: in response to a positive result of the decision, obtaining a software configuration file path where the string to be written is written; and obtaining row and column information of the string to be written in a destination software configuration file. Because the software configuration information of the software may be recorded into a plurality of configuration files having different file paths, it is necessary to obtain information on the specific file path where the specific string is written. Besides, according to one embodiment of the present invention, in order to locate the written string of the device specific information in the configuration file more accurately, the row and column information in the destination software configuration file may be further obtained. Those skilled in the art should understand that it belongs to the prior art how to obtain the row and column in the file where the string is written. For example, it is possible to calculate an initial location of the string based on the number of the line breaks and then analyze the length of the string to obtain the specific row and column information, which will not be detailed here.

It should be noted that the decision at step 304 is repeated for each and every writing method in the configuration program until all the writing methods are completely executed. For the sake of brevity, the diagram of cyclic execution is not shown in FIG. 3.

Figure 5:
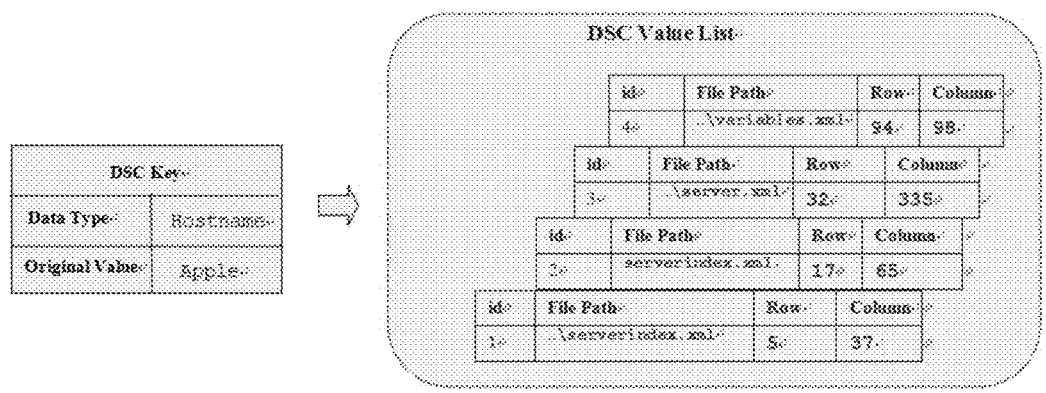
FIG. 5 shows an instance of correspondence relationships as recorded according to one embodiment of the present invention.

Next, the method shown in FIG. 3 proceeds to step 306 where the correspondence between the device specific information and the specific location information is recorded. Those skilled in the art should understand that the correspondence may be recorded by means of a file or any other data storage. As an example, FIG. 5 illustrates a record of the correspondence between the device specific information and the specific location information according to one embodiment of the present invention. As shown in FIG. 5, for the device specific information "HostName," its value "apple" under the current running environment is written into four different locations (different row, column values) in three different configuration files during the software configuration process.

Given such correspondence record, once the software needs to be deployed on another running environment (for example, a virtual machine), step 307 may be performed to obtain the new device specific information of the software in the new running environment, and then step 308 may be performed to use the correspondence to replace the original device specific information in the software configuration with new device specific information, thereby achieving rapid configuration of software. For example, it is determined at step 307 that the value HostName of the software in the new running environment is "pear," then at step 308, according to the record of the correspondence shown in FIG. 5, the string "pear" is used to replace the character "apple" at the corresponding location in the original configuration file, so as to rapidly implement the software configuration without re-installing the software.

It should be further noted that steps 307 and 308 are shown in a frame in FIG. 3 for the purpose of emphasizing that the two steps are not essential steps or required means of implementing the inventive objective. As long as the correspondence record as shown in FIG. 5 is obtained, the objective of the present invention is implemented, because such correspondence is sufficient to rapidly implement the software configuration. As to how to specifically utilize this correspondence record to actually implement the configuration task of the software, it will not affect the realization of the objective of the present invention. For example, even if the string in the corresponding configuration file is manually amended based on the correspondence relationship, the speed and efficiency of software configuration may be improved greatly.

Those skilled in the art should understand that the schematic example regarding code injection as provided above in the form of source code is only for making the example more comprehensible. During the actual code injection operation process, modification and replacement of the code may be directly performed in the target code layer, without the need of obtaining the source code of the configuration program.

Figure 6:
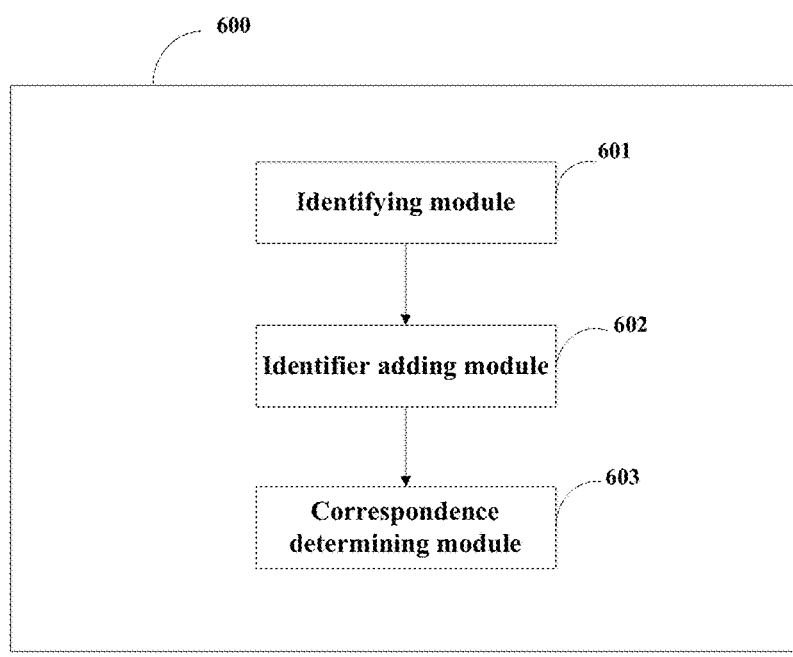
FIG. 6 shows a block diagram of a system for rapid configuration of software according to one embodiment of the present invention.

FIG. 6 shows a block diagram of a system for rapid configuration of software according to one embodiment of the present invention. The system as shown in FIG. 6 is generally indicated as system 600. Specifically, the system 600 comprises an identifying module 601 configured to obtain and analyze a software configuration program to identify a method related to the device specific information in the software configuration program; an identification adding module 602 configured to add an identification to a string value of the device specific information obtained by the method related to the specific device information; and a correspondence determining module 603 configured to determine a correspondence between the device specific information and its record location in a software configuration file based on the added identification. The modules 601-603 in the system 600 correspond to steps 201-203 in the method as shown in FIG. 2, which will not be detailed here.

The flowcharts and block in the figures illustrate the system, methods, as well as architecture, functions and operations executable by a computer program product according to the embodiments of the present invention. In this regard, each block in the flowcharts or block diagrams may represent a module, a program segment, or a part of code, which contains one or more executable instructions for performing specified logic functions. It should also be noted that, in some alternative implementations, the functions noted in the block may occur out of the order noted in the figures. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

Though the system and method for processing a local document with remote application has been described in detail with reference to preferred embodiments, the present invention is not limited to this. A person of normal skill in the art can make various changes, alterations and modifications to the present invention under the teaching of the description without departing from the spirit and scope of the present invention It should be understood that all such changes, alterations, and modifications still fall into the protection scope of the present invention. The protection scope of the present invention is defined by the appending claims.

The invention claimed is:

1. A computer-implemented method for rapid configuration of software, comprising:
    obtaining and analyzing a software configuration program to identify a method related to device specific information in the software configuration program, wherein the software configuration program is an installer program;
    adding an identification to the device specific information, obtained by the method related to the device specific information by replacing the method, related to the device specific information, as identified, with a new method including the identification, wherein the identification added to the device specific information is used to distinguish between different device specific information, and wherein the identification added is assigned to the method related to the device specific information and includes a data type, and wherein the identification added is defined as a string comprising the data type of the device specific information and an original value of the device specific information, and wherein a call to the new method returns the string instead of the original value;
    tracking and recording a path, as well as a row and a column of a software configuration file, where a specific string is written with the identification added; and
    determining a correspondence between the device specific information and a corresponding record location in the software configuration file based on the identification added.

2. The computer-implemented method according to claim 1, wherein the device specific information comprises at least one of a host name, an IP address, a MAC address, and a file path.

3. The computer-implemented method according to claim 1, wherein adding an identification to device specific information obtained by the method related to the device specific information comprises:
    replacing the identified method related to the device specific information with the new method having the identification by a code injection.

4. The computer-implemented method according to claim 1, wherein determining the correspondence between the device specific information and the record location in the software configuration file based on the identification added comprises:
    deciding whether a string to be written into the software configuration file has the identification added;
    obtaining, in response to a positive result of the decision, information on a specific location in the software configuration file where the string is written; and
    recording a correspondence between the specific device information and information on the specific location.

5. The computer-implemented method according to claim 4, further comprising:
    replacing, by a code injection, a string writing method in the software configuration program with a method for detecting whether the string to be written into the software configuration has the identification added.

6. The computer-implemented method according to claim 4, wherein obtaining, in response to the positive result of the decision, information on the specific location in the software configuration file where the string is written comprises:
    responsive to the positive result of the decision, obtaining a specific file path for the software configuration file where the string to be written is written and obtaining row and column information in the software configuration file where the string to be written is written.

7. The computer-implemented method according to claim 1, further comprising:
    obtaining new device specific information of the software in a new running environment; and
    replacing an original device specific information in the software configuration file with the new device specific information using the correspondence determined to implement a rapid configuration of software.

8. A computer system for rapid configuration of software, comprising:

a central processing unit;

a memory;

the computer system configured to obtain and analyze a software configuration program to identify a method related to device specific information in the software configuration program, wherein the software configuration program is an installer program;

the computer system configured to add an identification to the device specific information obtained by the method related to the device specific information by replacing the method, related to the device specific information, as identified, with a new method including the identification, wherein the identification added to the device specific information is used to distinguish between different device specific information, and wherein the identification added is assigned to the method related to the device specific information and includes a data type, and wherein the identification added is defined as a string comprising the data type of the device specific information and an original value of the device specific information, and wherein a call to the new method returns the string instead of the original value;

the computer system configured to track and record a path, as well as a row and a column of a software configuration file, where a specific string is written with the identification added; and the computer system configured to determine a correspondence between the device specific information and a corresponding record location in the software configuration file based on the identification added.

9. The computer system according to claim 8, wherein the device specific information comprises at least one of a host name, an IP address, a MAC address, and a file path.

10. The computer system according to claim 8, wherein the computer system is configured to:

replace the identified method related to the device specific information with the new method having the identification by a code injection.

11. The computer system according to claim 8, wherein the computer system is configured to:

decide whether a string to be written into the software configuration file has the identification added;

obtain, in response to a positive result of a decision, information on a specific location in the software configuration file where the string is written; and record a correspondence between the specific device information and the information on the specific location.

12. The computer system according to claim 11, wherein the computer system is further configured to:

replace, by a code injection, a string writing method in the software configuration program with a method for detecting whether the string to be written into the software configuration file has the identification added.

13. The computer system according to claim 11, wherein the computer system is further configured to:

responsive to the positive result of the decision, obtain a specific file path for the software configuration file where the string to be written is written and obtain row and column information in the software configuration file where the string to be written is written.

14. The computer system according to claim 8, wherein the computer system is further configured to:

obtain new device specific information of the software in a new running environment; and replace an original device specific information in the software configuration file with the new device specific information using the correspondence determined, to implement a rapid configuration of software.

\* \* \* \* \*